(12) United States Patent
Emin

(10) Patent No.: US 6,568,277 B1
(45) Date of Patent: May 27, 2003

(54) METHOD AND DEVICE FOR MEASURING PRESSURE INSIDE A STEAM GENERATOR

(75) Inventor: Michel Emin, Fully (FR)

(73) Assignee: Electricite de France Service National, Paris (FR)

( * ) Notice: Subject to any disclaimer, the term of this patent is extended or adjusted under 35 U.S.C. 154(b) by 0 days.

(21) Appl. No.: 09/622,671
(22) PCT Filed: Mar. 3, 1999
(86) PCT No.: PCT/FR99/00478
§ 371 (c)(1), (2), (4) Date: Oct. 27, 2000
(87) PCT Pub. No.: WO99/45353
PCT Pub. Date: Sep. 10, 1999

(30) Foreign Application Priority Data

Mar. 4, 1998 (FR) .......................................... 98 02623

(51) Int. Cl.[7] .................................................. G01L 7/10
(52) U.S. Cl. ..................................................... 73/729.02
(58) Field of Search ............................... 73/729.2, 732, 73/715, 4, 710, 756; 123/254; 122/5; 126/110, 437, 20; 219/326, 401, 281; 426/1

(56) References Cited

U.S. PATENT DOCUMENTS 2,024,003 A    12/1935   Jewell
3,927,983 A  * 12/1975   Gordon et al. ................. 23/260
4,445,023 A  *  4/1984   McKenney ................... 219/326
4,537,178 A  *  8/1985   Hwang et al. ................ 126/110
6,107,605 A  *  8/2000   Creamer et al. .............. 219/401

FOREIGN PATENT DOCUMENTS

FR              2422154       11/1979

* cited by examiner

*Primary Examiner*—Hezron Williams
*Assistant Examiner*—Marissa Ferguson
(74) *Attorney, Agent, or Firm*—Thelen Reid & Priest LLP; Robert E. Krebs

(57) ABSTRACT

The method and device are able to overcome possible clogging of measuring devices comprising probes each surrounded by a tranquilliser.

Figure 1:
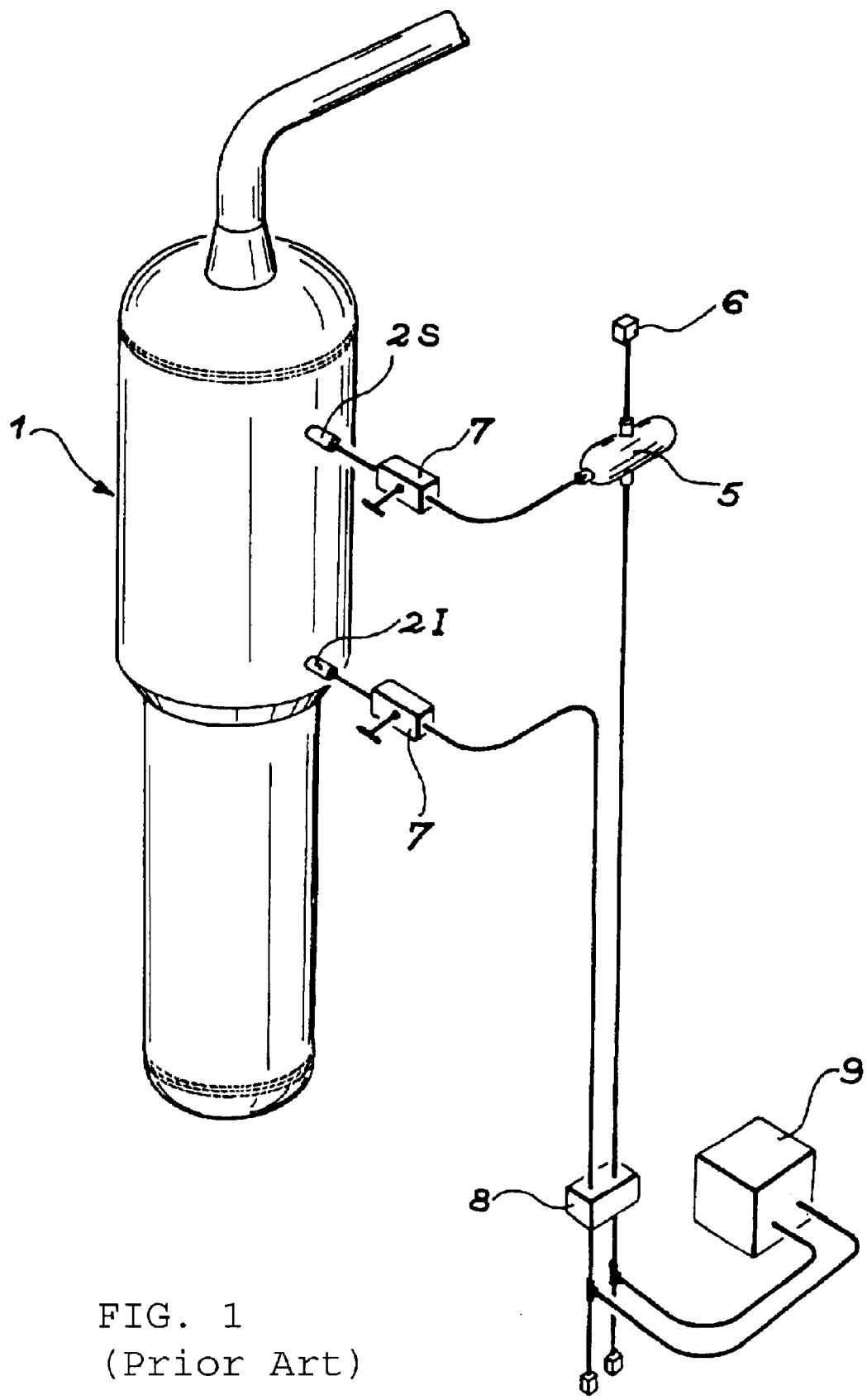

It chiefly comprises a tranquilliser (21), preferably spherical in shape, fitted with a separating partition (33) allowing measurement via side holes (32) in a measuring channel (20) and return of condensates via end holes (35) leading to a deflector for evacuation via slatted openings (23) leading into the steam generator (1). Outer measuring holes are made in the median plane of the tranquilliser (21).

Application to all steam generators.

13 Claims, 4 Drawing Sheets

METHOD AND DEVICE FOR MEASURING PRESSURE INSIDE A STEAM GENERATOR

DESCRIPTION

1. Field of the Invention

The present invention concerns the measurement of pressure inside a steam generator used in a nuclear installation for the production of electricity. It relates more precisely to control of the water level in the secondary circuit of the steam generator.

2. Prior Art and Problem Raised

In steam generators measurement of the water level in the secondary circuit is made by means of several probes or pressure measuring devices so that differential pressure measurements can be made. With reference to FIG. 1, two probes 2S and 2I are shown on the outer wall of a steam generator 1, positioned at different heights. The lower probe 2I is placed just above the generator cyclones, the upper probe 2S being positioned a few meters overhead, vertically above lower probe 2I. This device for measuring differential pressure is completed by a gate 7 on each measuring lane, a condensation pipe 5 downstream from the upper probe 2S surmounted by vent-hole 6, a stabilizing interface 8 and measuring equipment 9.

Figure 2:
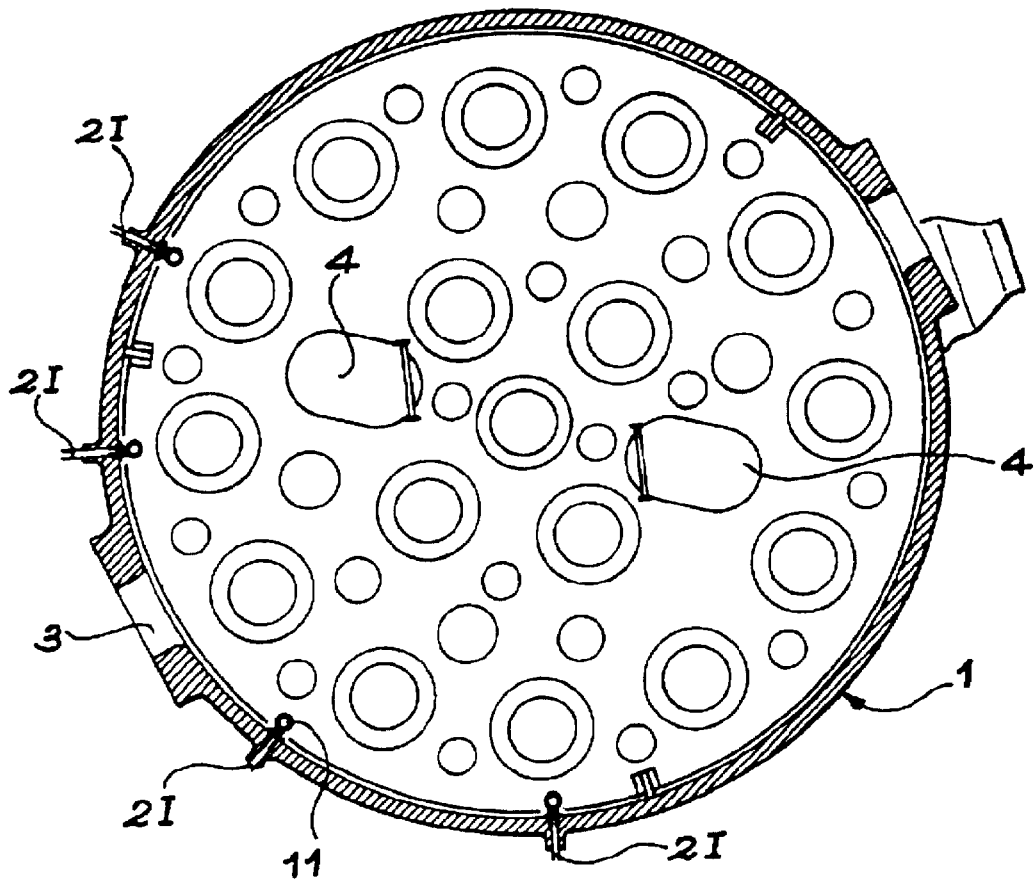

FIG. 2 shows a section of a steam generator at the level of the lower probe 2I shown in FIG. 1. In fact, several lower probes 21 are used. They lead to inside the steam generator 1. They are covered or surrounded by a tranquilliser 11 of spherical shape. In FIG. 2 manholes 4 are also shown and the outlets of secondary circuit 3.

Figure 3:
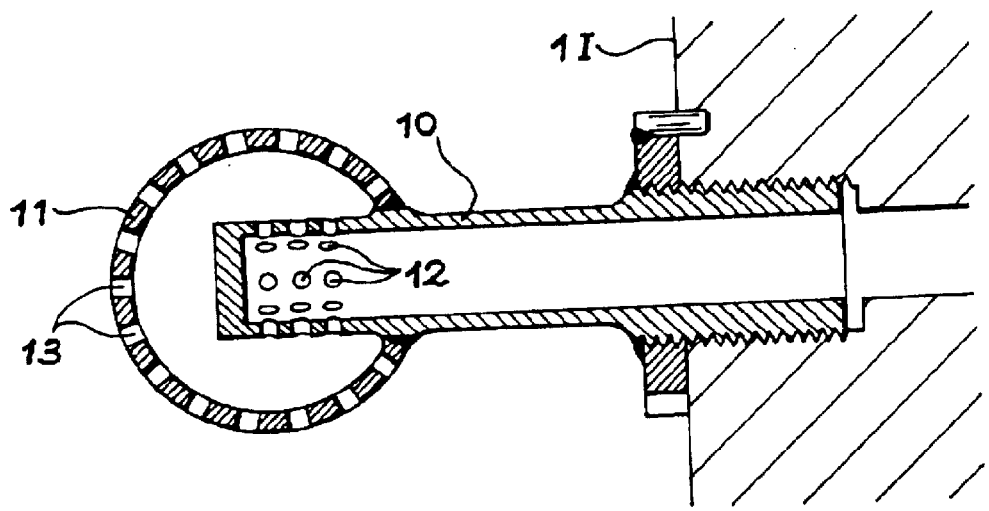

FIG. 3 shows in more precise manner, and in section view, a probe covered by its tranquilliser. The actual probe is chiefly formed of a sensor pipe 10 fixed onto the inner wall 1I of steam generator 1, whose end part leading into steam generator 1 is surrounded by a spherical-shaped tranquilliser 11. The sensor pipe 10 is closed at its end part but has measuring side holes 12 with which it can sense pressure inside the steam generator. Also, tranquilliser 11 has openings 13 on its sphere allowing the flow of steam to penetrate inside the tranquilliser 11 so that it can be made accessible to sensor pipe 10.

Therefore, several probes, or pressure measuring devices, are placed inside the steam generator so that they can be used to control the pressure inside the generator in order to achieve its optimal functioning.

At certain operating powers of the steam generator, however, in particular at 35% and 100%, thermo-hydraulic phenomena cause clogging of the lower or low pressure probes 2I of an installation for measuring differential pressure, in particular when they have a tranquilliser such as that denoted 10 in FIG. 3. This clogging is mainly due to the depositing of magnetite which forms in the secondary circuit and is carried by the steam. This clogs the openings 13 of tranquilliser 11 and possibly also the side holes 12 of the sensor pipe 10. This clogging causes the condensation pipe 5 in FIG. 1 to fill up, since it prevents the evacuation of return water coming from the condensation pipe, downstream from the measuring equipment. The weight of the column of water thus formed in the measuring equipment is therefore found in the column of water of the low pressure line of the differential pressure sensor. Consequently, the overall measurement of the level inside the steam generator is distorted. This has a strong incidence on the functional safety of the steam generator and on the proper operation of nuclear units.

It is to be noted that these tranquilliser clogging phenomena are particularly apparent on the tranquillisers the furthest from the cyclones in which the steam flow rate vector is oriented differently.

This clogging phenomenon is generally accounted for by the equilibrium existing between the potential energy of the water column increased by reduced pressure in the condensation pipe due to steam condensation, and the kinetic energy of steam. It is specified that overpressures exist below the spherical tranquilliser 13 in FIG. 3, and that reduced pressures exist above it. They are due to the strong current along the walls to which the measuring equipment is fixed. The holes or openings 13 of the tranquilliser 11 may therefore become too small and cause their partial blockage. Since the current inside the sphere forming tranquilliser 13 is relatively low, there may be fouling of the sensor pipe 10.

It is to be noted that this is a problem which dates back as far as 1979.

The purpose of the invention is therefore to remedy these drawbacks by proposing a new type of pressure measuring device intended to measure the differential pressure inside existing steam generators.

SUMMARY OF THE INVENTION

For this purpose, the first main object of the invention is a method for measuring pressure inside a steam generator which chiefly comprises:
- a sensor tube leading into the steam generator via a closed end part, but provided with side holes;
- a tranquilliser surrounding the end of the sensor tube to free the side holes of the sensor tube from harmful dynamic effects produced by surrounding steam currents; and
- a condensation pipe on the sensor tube. the method consisting of returning the condensates via the sensor tube.

According to the invention, the method consists of separating the pressure measurement made by the side holes of the sensor tube from the return of condensates via the end part of the sensor tube which is pierced for such purpose with end holes.

In the embodiment of the method of the invention, it is preferable to use a deflector in the tranquilliser in order to set up a chamber free of dynamic pressure opposite these end holes in order to promote emptying of the condensates.

Preferably, the sensor tube is slightly tilted towards the inside of the steam generator to promote the evacuation of the condensates.

The second main object of the invention is a device for measuring pressure inside a steam generator made up of:
- a sensor tube leading into the steam generator via a closed end part but which is provided with side holes;
- a tranquilliser surrounding the closed end part of the sensor tube and having openings to free the side holes of the sensor tube from the harmful dynamic effects of steam currents in the vicinity of the sensor tube; and
- a condensation pipe on the sensor tube, characterized in that, in the tranquilliser, separation means are provided to delimit a measuring channel starting at the side holes of the sensor tube and an emptying channel starting at, at least one, end hole made in the closed end of the sensor tube.

Preferably, these separation means are formed of a separating partition inside the tranquilliser which is of spherical shape, thereby delimiting the emptying channel by a emptying chamber and the measuring channel by a measuring chamber.

In the preferred embodiment of the device of the invention, the measuring channel leads into the steam generator via measuring holes made in the median horizontal plane of the part of the tranquilliser corresponding to the measuring channel.

Preferably, it is of advantage to use a deflector in the tranquilliser, placed opposite at least one end hole made in the end part of the sensor tube so as to form a chamber free of dynamic pressure in the tranquilliser.

It is also preferable to make passage holes in the lower part of the separating partition to promote the evacuation of condensates into the emptying channel.

It is also of advantage, in order to facilitate emptying of the condensates from the condensation pipe, for the sensor tube to be slightly tilted downwards inside the steam generator.

For the purpose of relatively easy maintenance of the device, at least one measuring hole provided in the tranquilliser should be placed opposite a side hole of the sensor tube.

The emptying channel communicates with the inside of the generator via holes which are formed of slatted openings made in that part of the tranquilliser corresponding to the emptying channel.

Provision is made so that the fixation means of the device to the inner wall of the steam generator are formed of at least one magnetic part to partly trap waste circulating in the vicinity of the device.

LIST OF FIGURES

Figure 4:
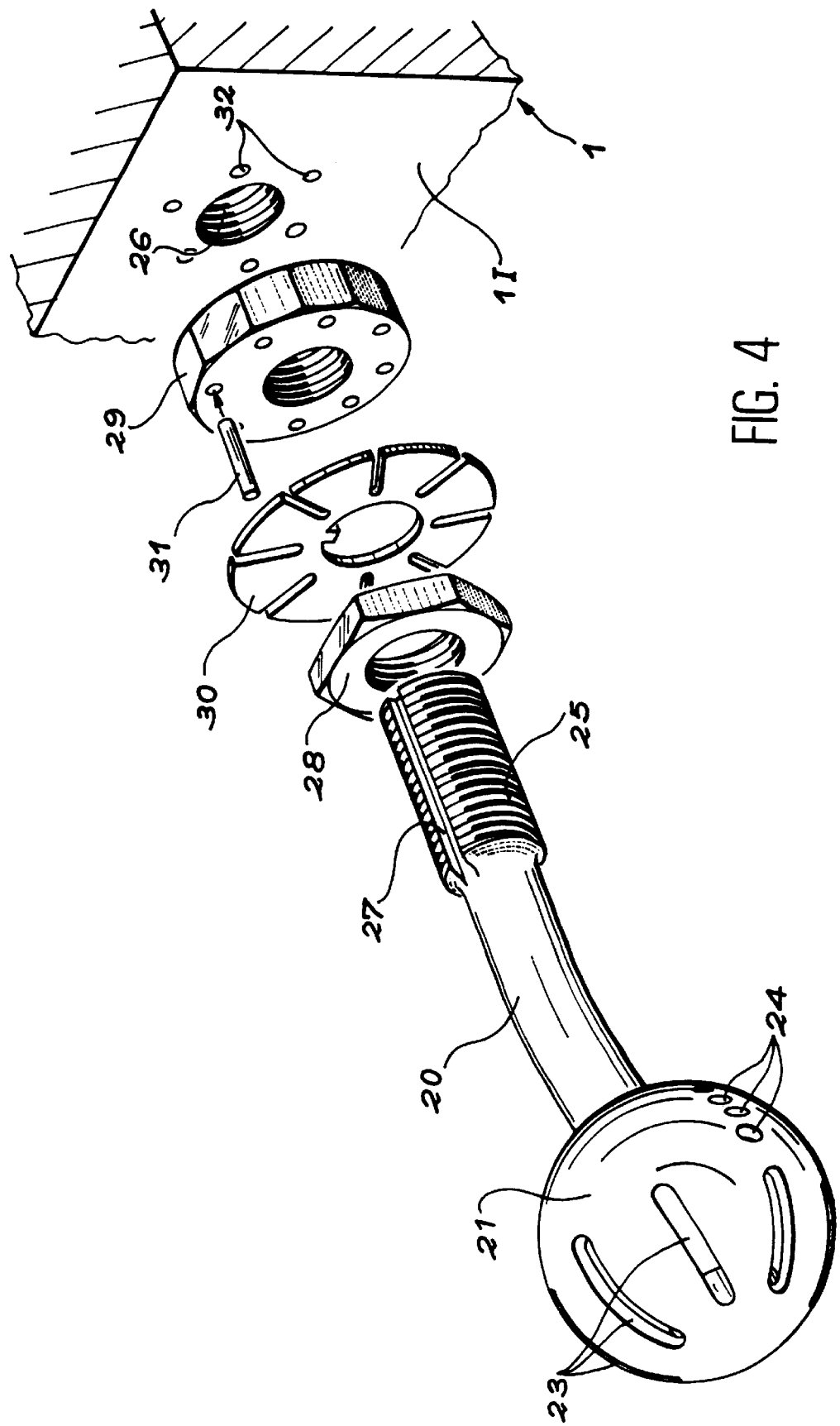
Figure 5:
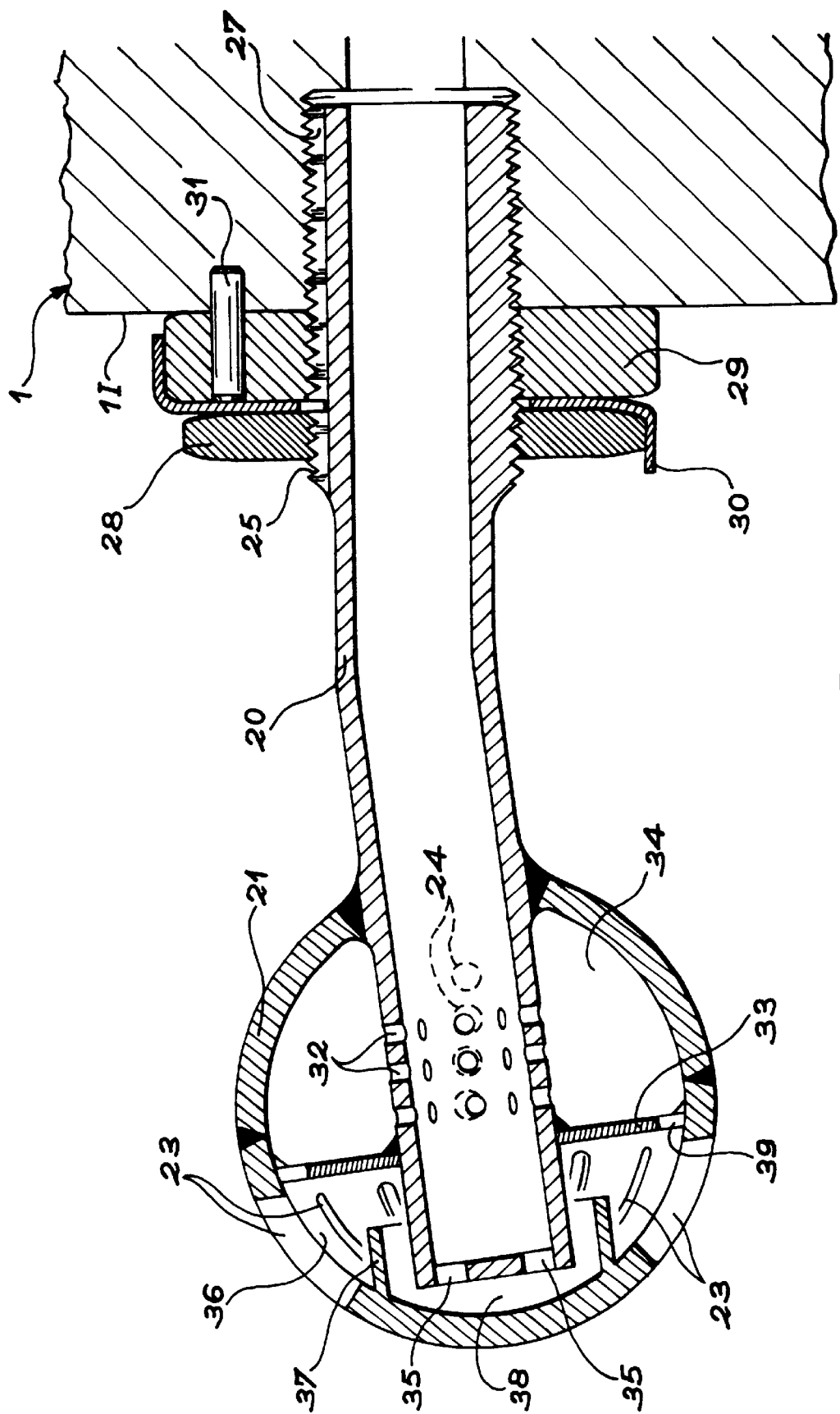

The invention and its different technical characteristics will be better understood on reading the following description with reference to several appended figures respectively showing:

FIG. 1, the principle of differential pressure measurement inside the steam generator;

FIG. 2, a section view of the part of a steam generator in which pressure measuring devices are installed in the steam generator;

FIG. 3, a section view of a pressure measuring device of the prior art inside a steam generator;

FIG. 4, a view showing an embodiment of the measuring device of the invention; and FIG. 5, a section view, showing the main embodiment of a measuring device according to the invention.

DETAILED DESCRIPTION OF ONE EMBODIMENT OF THE INVENTION

With reference to FIG. 4, the pressure measuring device of the invention is also chiefly made up of a sensor tube 20 and a tranquilliser 21. It is fixed to the inner wall 1I of the steam generator 1 by fixation means which may be formed of a threaded part 25 made on the outer wall of the sensor tube 20, having a groove 27, which screws into the inside of a threaded hole 26 cut in the inner surface 1I of the steam generator 1. In order to lock in rotation the measuring device of the invention in its optimal operating position, a fixing nut 28 and a flange 29 are screwed onto threaded part 25. A winged washer 30 and an adjusting pin 31 complete these fixation means to position these elements in rotation. The winged washer 30 is locked into groove 27 and the adjustment pin 31 is inserted in an adjustment hole 32 on the inner wall 1S of the steam generator 1. It is to be noted that it is preferable for one fixation part, for example the fixation nut 28, to be in a magnetic material so that it will form a trap for waste carried by the steam, magnetite in particular.

It will be seen in this FIG. 4 that the sensor tube 20 is slightly tilted downwards on the side of the tranquilliser 21. This promotes the outflow of steam condensates coming from the condensation pipe placed outside the steam generator 1, which are to be evacuated via holes 23 of tranquilliser 21. The tilt angle of this end part of the sensor pipe 20 is preferably 7°, this slope forming a maximum yield slope for a discharge such as the outflow of condensates from the sensor tube 20.

Openings 23 are provided in the form of slatted holes made on the front of the sphere forming the tranquilliser 21.

The measuring holes 24 are made in the tranquilliser 21, along its horizontal median plane. With this provision it is possible not to take into account any substantial pressure differences prevailing just above and just below the tranquilliser 21, but on the contrary only to take into account an average pressure prevailing between these two extremes.

It is specified that the openings in the form of slatted openings 23 discourage any clogging of any type owing to the large surface area of these openings 23 and their elongated shape, irrespective of the rate of flow of the steam circulating in the vicinity of the tranquilliser 21.

FIG. 5 gives a much better, and more detailed, view of the different technical characteristics of the pressure measuring device of the invention. In this FIG. 5 the fixation means are again shown, namely the threaded part 25 on sensor tube 20, fixation nut 28, winged washer 30, fixation flange 29 and adjustment pin 31.

Inside the tranquilliser 21, on the wall of the sensor tube 20, can be seen side holes 32. These lead into the inside of the sphere forming the tranquilliser 21. A separating partition 33 is installed inside tranquilliser 21 so that these side holes 32 lead into a part different to the part in which openings 23 are made in the form of slatted openings on tranquilliser 21. In this manner, the side holes and the sensor tube 20 form a first part of the measuring channel which is extended by a measuring chamber 34 delimited by separating partition 33. This measuring channel ends in the measuring holes denoted 24 in FIG. 4 made in the sphere forming the tranquilliser 21, and leading into the steam generator 1.

In this manner, the separating partition 33 also delimits the emptying channel formed of the sensor tube 20 whose end part has at least one end hole 35 enabling it to communicate with an emptying chamber 36 which, inside the tranquilliser 21, is delimited by the separating partition 33. The emptying channel therefore ends in the slatted holes forming openings 23 on the tranquilliser 21.

The tranquilliser 21, in its emptying chamber 36, and opposite the one or rather two end holes 35, has a deflector 37 which forms a considerable obstacle for the steam flow circulating vertically in the tranquilliser 21 via openings 23. Therefore, the difference in pressure prevailing just above and just below the tranquilliser 21 only has a very slight influence on the pressure prevailing in the sensor tube 20 on account of this deflector 37 which in fact allows the formation of a chamber free of dynamic pressure 38 positioned opposite end holes 35.

Passage holes 39 in the separating partition 33 also permit partial emptying of part of the condensates which would have a propensity to leave the sensor tube 20 via lateral holes 32 and would then enter the measuring chamber 34. These passage holes 39 therefore enable these condensates to pass into the emptying chamber 36 and to escape via openings 23 in the steam generator.

With reference both to FIGS. 4 and 5, it is preferable to make provision so that some measuring holes 24 on the tranquilliser 21 are placed opposite the side holes 32 on the measuring tube 20, so that servicing using cleaning tools is possible from outside the measuring device. An iron rod in particular is had in mind which could be easily inserted both in the measuring holes 24 and in the side holes 32.

The material envisioned for this pressure measuring device is a chromium and nickel steel, for example 22 C N 17–22 steel.

It is pointed out that in the French electricity board's nuclear installations in France, the clogging of spheres forming tranquillisers on differential pressure measuring probes causes a drop in load until coherency can be restored between the different probes. It is also pointed out that this problem exists on all steam generators in all thermal or nuclear units, and more generally on all steam generators fitted with level measuring equipment.

What is claimed is:

1. A method for measuring pressure inside a steam generator by means of a device, the method comprising:

providing a sensor tube leading into a steam generator, the sensor tube having first and second ends, the first end including side holes, wherein a baffle is disposed about the side holes, the baffle configured to free the side holes of dynamic effects due to steam currents in the vicinity of the baffle; and providing a condensation pipe, the condensation pipe connected to the sensor tube wherein the condensation pipe is configured to return condensates through the sensor tube, wherein the condensation pipe is further configured to separate pressure measurement from said condensates by providing an aperture formed in a distal end of the first end of the sensor tube.

2. The method according to claim 1, wherein the baffle further includes a deflector disposed therein, wherein the deflector is configured to provide a chamber free of dynamic pressure positioned opposite said aperture formed in said distal end.

3. The method according to claim 1, further including draining said condensates from said sensor tube through said aperture slightly tilting the sensor tube towards the inside of the steam generator.

4. A device for measuring pressure inside a steam generator, said device comprising:

a sensor tube leading into a steam generator through an end part provided with side holes;

a baffle disposed about the end part of the sensor tube and the side holes, said baffle including openings said openings configured to free the side holes of sensor tube from harmful dynamic effects of steam currents in the vicinity of the measuring device; and a condensation pipe connected to the sensor tube, wherein the baffle further includes separation means to delimit a measuring channel starting at the side holes of the sensor tube and emptying channel starting at least at one end hole made in the end part of the sensor tube.

5. The device according to claim 4, wherein the separation means are formed of a separating partition disposed within the baffle, thereby delimiting the emptying channel by an emptying chamber and the measuring channel by a measuring space.

6. The device according to claim 4, wherein the measuring channel is in communication with the inside of the steam generator through at least one aperture formed in a distal end of the first end of the sensor tube, wherein the distal end of the sensor tube is within the baffle.

7. The device according to claim 4, wherein the device further includes a deflector disposed within the baffle, the deflector disposed opposite at least one end hole formed within the end part of the sensor tube, said baffle configured to defined a chamber free of dynamic pressure within the baffle.

8. The device according to claim 4, wherein the a lower portion of the separating partition further includes at least one passage hole, said passage hole configured to promote evacuation of condensates through said emptying channel.

9. The device according to claim 4, wherein to facilitate the emptying of the condensates from the condensation pipe, the sensor tube is slightly tilted downwards inside the steam generator.

10. The device according to claim 4, wherein for the purpose of relatively easy maintenance of the device, at least one measuring hole formed within the baffle is positioned opposite a side hole of the sensor tube.

11. The device according to claim 4, wherein the emptying channel communicates with the inside of the steam generator through openings formed in the baffle, wherein said openings are further in communication with the emptying channel.

12. The device according to claim 4, wherein the device further includes fixation means on the inner wall of the steam generator, said fixation means including at least one magnetic part configured for partial trapping of waste circulating in the vicinity of the device.

13. The method according to claim 3, wherein said sensor tube is tilted at an angle of about seven degrees.

* * * * *

UNITED STATES PATENT AND TRADEMARK OFFICE
CERTIFICATE OF CORRECTION

PATENT NO.    : 6,568,277 B1
DATED         : May 27, 2003
INVENTOR(S)   : Michel Emin It is certified that error appears in the above-identified patent and that said Letters Patent is hereby corrected as shown below:

<u>Title page,</u>
Item [73], Assignee, after "Electricite de France Service National, Paris (FR)" insert
-- M.I.R.R., Quintenas (FR) --.

Signed and Sealed this

Fourteenth Day of October, 2003

JAMES E. ROGAN
*Director of the United States Patent and Trademark Office*